United States Patent
Stevens

(10) Patent No.: US 8,797,457 B2
(45) Date of Patent: Aug. 5, 2014

(54) APPARATUS AND METHOD FOR FRAME RATE PRESERVING RE-SAMPLING OR RE-FORMATTING OF A VIDEO STREAM

(75) Inventor: Andrew Stevens, Neuoetting (DE)

(73) Assignee: Entropic Communications, Inc., San Diego, CA (US)

( * ) Notice: Subject to any disclaimer, the term of this patent is extended or adjusted under 35 U.S.C. 154(b) by 1235 days.

(21) Appl. No.: 12/067,080

(22) PCT Filed: Sep. 13, 2006

(86) PCT No.: PCT/IB2006/053253
§ 371 (c)(1),
(2), (4) Date: Apr. 29, 2009

(87) PCT Pub. No.: WO2007/034372
PCT Pub. Date: Mar. 29, 2007

(65) Prior Publication Data
US 2010/0118183 A1      May 13, 2010

(30) Foreign Application Priority Data

Sep. 20, 2005   (EP) ..................................... 05108635

(51) Int. Cl.
*H04N 7/01*      (2006.01)
*H04N 11/20*    (2006.01)

(52) U.S. Cl.
USPC ........... 348/441; 348/443; 348/445; 348/446; 348/448; 348/456; 348/458; 348/459; 348/522; 348/523; 348/567; 348/657; 348/697; 348/180; 348/184; 348/231.99; 348/231.1; 348/312; 345/3.2; 345/534; 345/538; 345/547; 345/553; 345/560; 345/565; 380/221; 382/107

(58) Field of Classification Search
USPC ......... 348/441, 458, 445, 459, 446, 443, 448, 348/456, 180, 184, 231.99, 231.1, 312, 522, 348/523, 567, 657, 697, 715; 345/3.2, 534, 345/538, 547, 553, 560, 565; 380/221; 382/107
See application file for complete search history.

(56) References Cited

U.S. PATENT DOCUMENTS 5,739,867 A    4/1998 Eglit
5,953,074 A    9/1999 Reddy
(Continued)

FOREIGN PATENT DOCUMENTS

EP    0 865 198 B1    7/2003
EP    1 487 201 A1    12/2004
(Continued)

OTHER PUBLICATIONS

International Search Report for appln. PCT/IB2006/053253.
(Continued)

*Primary Examiner* — Jefferey Harold
*Assistant Examiner* — Mustafizur Rahman
(74) *Attorney, Agent, or Firm* — Richard Bachand; Duane Morris LLP

(57) ABSTRACT

An apparatus configured to match an input frame rate of a video stream with an output frame rate of an output stream, the apparatus comprising, at least one memory buffer, an output frame generator, and a threshold measurement unit, the threshold measurement unit configured to generate a control feedback, wherein the box is configured to analyze the control feedback to monitor a state of the at least one memory buffer, the threshold measurement unit further configured analyze the control feedback to regulate between two or more different settings, wherein the two or more different settings include slowing down or speeding up the output frame, wherein the two or more different settings further include slowing down or speeding up of the line rate of the output stream.

20 Claims, 2 Drawing Sheets

(56) References Cited

U.S. PATENT DOCUMENTS

| | | |
|---|---|---|
| 6,002,446 A | 12/1999 | Eglit |
| 6,078,361 A | 6/2000 | Reddy |
| 6,177,922 B1 * | 1/2001 | Schiefer et al. ............... 345/698 |
| 6,353,459 B1 * | 3/2002 | Yeh et al. ...................... 348/441 |
| 6,522,363 B1 | 2/2003 | Deiss et al. |
| 6,529,600 B1 * | 3/2003 | Epstein et al. ................ 380/252 |
| 6,803,893 B1 | 10/2004 | Hwang |
| 2002/0141619 A1 * | 10/2002 | Standridge et al. ........... 382/107 |
| 2005/0105469 A1 * | 5/2005 | Hao ............................... 370/235 |

FOREIGN PATENT DOCUMENTS

| | | |
|---|---|---|
| EP | 1 863 279 A2 | 12/2007 |
| JP | 2004180290 A | 6/2004 |
| JP | 2005094458 A | 4/2005 |
| WO | 99/67950 A2 | 12/1999 |

OTHER PUBLICATIONS

Communication mailed on Feb. 17, 2011 corresponding to the related European Patent Application No. 06796016.1.

* cited by examiner

APPARATUS AND METHOD FOR FRAME RATE PRESERVING RE-SAMPLING OR RE-FORMATTING OF A VIDEO STREAM

STATEMENT OF RELATED CASES

This application is a US national stage entry of, and claims priority under 35 U.S.C. 371 to PCT/IB2006/53253 filed 13 Sep. 2006.

FIELD OF THE INVENTION

The invention concerns the re-formatting of video streams prior to sending the respective video signals to a display device.

BACKGROUND

When displaying video signals on a fixed-matrix display device (e.g., a TFT display panel), the input video frequently needs to be reformatted in order to suit the display device. The horizontal blanking and/or the clock rate may need to be changed and the image might have to be re-sampled to adjust the line and pixel resolution whilst minimizing or even eliminating output line rate fluctuations. For low-cost applications this can be done using only a small, inexpensive, memory buffer holding only a few lines of video image. However, in this case the output video signal has to be accurately synchronized with the input video.

If the input video clock (digital video) or the synchronization frequency (analog signal) is stable relative to the output clock, the main problem that needs to be solved is maintaining the correct delay (called phase-offset) between the vertical synchronization in input and output. The correct delay depends on the re-formatting being performed. The output of image data in each output frame needs to start just the right amount of time after the first input image data is captured so that the memory buffer, also known as decoupling memory buffer, is pre-filled with the right amount of image data: not so much that it later overflows and not so little that it later runs empty. A fine-tuning feedback control of the clock or frame layout is required because constraints on the frame geometry imposed by the display device or the clocking precision make it impossible to exactly match input and output frame timings and/or to avoid a gradual drift due to temperature variation and so forth.

The obvious and well-known method to maintain a fixed vertical synchronization phase offset is to implement a phase-locked loop that regulates the output clock to maintain the selected target phase offset between input and output vertical synchronization. The respective vertical phase-locked loop may be solely responsible for the output video clock (output frame rate) or it may act as a fine-tuning regulator on a free-running clock or a clock line-locked to the input horizontal synchronization signal. This method requires relatively precise calculations in hardware.

Another method is proposed in the U.S. Pat. No. 6,353,459. According to this US patent, a phase offset between input and output vertical synchronization is achieved in that the output of a buffer memory is simply triggered if a certain threshold level in the buffer memory is reached. That is, the output for a frame commences when a memory buffer threshold level is reached. Such a solution is not flexible at all and a respective implementation is not able to cope with the different situations that might occur when handling video streams in a computer (PC) environment or in a television (TV) application, for instance. Furthermore, many of the modern flat-panel displays are not able to cope with the video signals output by a system being based on the teaching of this US patent. It is an object of the present invention to provide an alternative and more efficient scheme for the synchronization and/or re-formatting of video signals.

It is an object of the present invention to provide a scheme for the synchronization and/or re-formatting of video signals that requires minimal memory buffering.

SUMMARY

These and other objects are accomplished by an apparatus according to claim 1 and a method according to claim 15. Further advantageous implementations are given in the dependent claims.

According to the present invention, one is able to automatically select between alternative output clocks and/or output frame layouts. This selection is made based on the current state of a decoupling memory buffer. A respective regulation mechanism/scheme is implemented that monitors the current state of the decoupling memory buffer and that actively regulates the output video stream.

The invention is based on the recognition that an effective and reliable under/overflow management can be more directly achieved by a control feedback from a buffer state rather than by a control feedback from the input and output synchronizations, as used in conventional phase-locked loop-based devices.

The invention proposed is an effective and reliable alternative method that is simpler than the approaches that implement a phase-locked loop.

An apparatus in accordance with the invention allows a clocks-per-line and a clock variation to be traded off to suit the characteristics of the apparatus receiving the output video.

It is a further advantage of the invention that the memory buffer size can be kept close to the theoretical minimum. This leads to cost savings. Furthermore, an implementation of the inventive device in VLSI circuitry is very simple.

It is another advantage that for those intervals when a stable input video is present, completely stable output timing with no line frequency or blanking variation is achieved.

Further advantageous embodiments are addressed in connection with the detailed description.

BRIEF DESCRIPTION OF THE DRAWINGS

For a more complete description of the present invention and for further objects and advantages thereof, reference is made to the following description, taken in conjunction with the accompanying drawings, in which.

DETAILED DESCRIPTION

Figure 1:
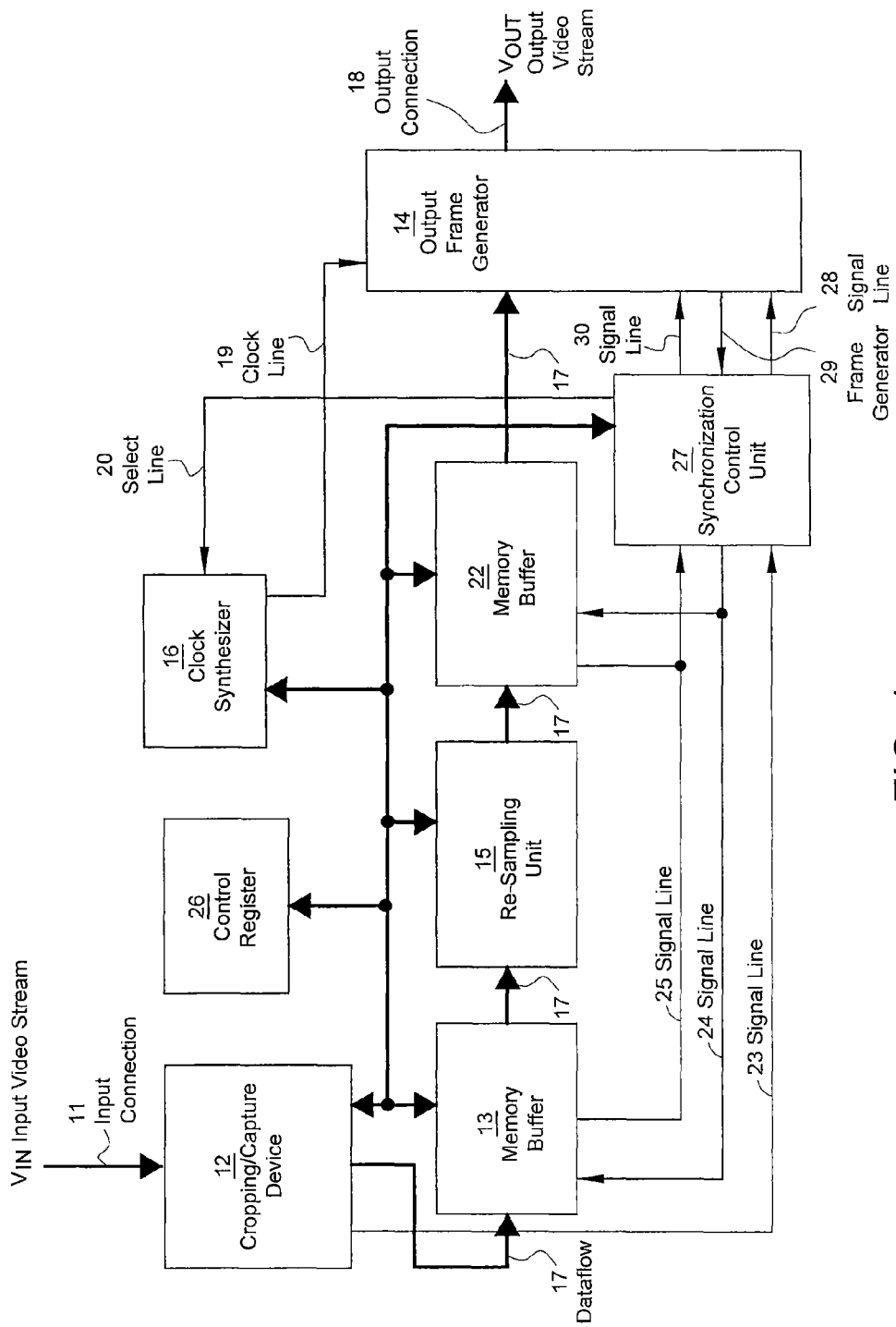
FIG. 1 is a schematic representation of a first embodiment of the present invention.

An apparatus 10 for re-sampling (also referred to as scaling in the context of video signal processing of the kind being discussed herein) and/or reformatting a video stream $V_{IN}$ without the use of a large (frame or part-frame) memory buffer is shown in FIG. 1. The video stream $V_{IN}$ transmitted via a connection 11 is received by a cropping/capture device 12. In addition to this cropping/capture device 12, the apparatus 10 at least comprises a memory buffer 13 or 22, an output frame generator 14, and a re-sampling unit 15. It furthermore may comprise control registers 26. There is also a so-called synchronization control unit 27. The regulation scheme of the present invention is distributed. The synchronization control unit 27 is in the present example drawn as a separate box. This does not necessarily mean that in a practical embodiment there will be a physical unit 27. Part of the elements or functionality of the unit 27 may for instance be realized inside the output frame generator 14. It is also possible to realize all of the synchronization control unit 27 inside the output frame generator 14.

The basic dataflow is shown in FIG. 1 by means of arrows 17 going from the cropping/capture device 12 and the re-sampling unit 15 to the output frame generator 14. This kind of dataflow is common to many devices of this type. The input video stream $V_{IN}$ transmitted via the connection 11 is received using a provided or synthesized/synchronization locked clock. The image data received as input video stream $V_{IN}$ is processed by the cropping/capture device 12 and is passed on to the re-sampling unit 15. The re-sampling unit 15 generates a re-sampled image which is forwarded to the output frame generator 14. The frame generator 14 adds the desired framing (blanking and synchronization signals) and outputs the video signals to a display (not shown) via an output connection 18. A clock synthesizer 16 is employed in order to generate clock signals for the output frame generator 14. The clock signal for the output frame generator 14 is made available on the clock line 19. The synchronization control unit 27 provides an output clock select signal via the select line 20 to the clock synthesizer 16. This output clock select signal allows the selection of the clock speeds in the clock synthesizer 16 and or the blanking length in the frame generator (29). The clock signal for the cropping/capture device 12 is provided separately. This clock is asynchronous to the output video clock generated by the clock synthesizer 16. It may either be supplied directly as part of the input video signal $V_{IN}$, or it may be regenerated from the synchronization timing of the input video signal $V_{IN}$. The output video clock, however, is synthesized either from this input clock (typical in TV applications), or a free-running oscillator (this is more common for computer monitors).

According to the present invention there is a threshold measurement unit 8 inside or connected to the buffer memory 13 or 22. This threshold measurement unit 8 generates the threshold signals (threshold over/under signals) which are sent across the line 25 to the synchronization control unit 27. The threshold signals are generated from the fullness of the memory buffer 13 or 22 and are communicated via the line 25 to the synchronization control unit 27.

There is a line 28 via which the current position in the generated frame is communicated from the output frame generator 14 to the synchronization control unit 27.

According to the present invention there is an optional logic 9 inside or connected to the cropping/capture device 12. This optional logic 9 generates the signal communicated via the line 23. This signal is used to signal a designated position in captured frames. Also optional is a signal sent across the line 30. This signal triggers the repetition of a designated output blanking line in the output frame generator 14.

The memory buffer 13 is a FIFO memory buffer being employed for the vertical up-sampling position. In addition to this memory buffer 13, another memory buffer 22 may be employed, as illustrated in FIG. 1. The memory buffer 22 is a FIFO memory buffer being employed for the vertical down-sampling position.

In FIG. 1 there are three additional signaling lines 23, 24, and 25 shown. These lines 23-25 are employed in this particular embodiment of the invention in order to facilitate the regulation scheme, as will be discussed below. For the most basic embodiment just the signal line 25 is needed. The other two lines 23 and 24 are optional.

According to the present invention, the clock and output horizontal blanking at the output frame generator 14 is regulated so that, allowing for pauses in the routing of the video dataflow through the apparatus 10, input image data (input video stream $V_{IN}$) is read as nearly as possible as rate as it arrives and the re-sampled image data $V_{OUT}$ is output as nearly as possible as the rate that it is generated. The vertical blanking generated by the frame generator 14 is laid out so that the input and output frames have as nearly as possible the same duration.

The irregular bursts of the dataflow that result from cropping, re-sampling and reformatting are buffered using a small FIFO memory buffer 13 holding at most a small number of lines of image data. Well suited is a FIFO memory buffer 13 that is designed to hold between 1.5 and 4 lines. The buffering is needed because, although the average dataflow into/out of the resampler 15 closely matches the required dataflow required for the input and output formats and data-rates, the dataflow is irregular at the line level. When performing the vertical up-sampling, not all output lines cause a new line of input image data to be read and this data is read at the rate at which an output line is generated. Consequently, when performing a vertical up-scaling it is necessary to buffer the input pixel data as it arrives ahead of the time it is required by the resampler 15.

Similarly for the vertical down-scaling not every input line causes an output line to be produced. Consequently, when vertically down-scaling it is necessary to buffer the re-sampled image data ahead of the time it is required by the frame generator 14. In this case the memory buffer 22 is needed, as addressed above.

For clarity, FIG. 1 shows two possible positions of the FIFO memory buffer 13/22. In practice, if the vertical scale factor does not change when the resampler 15 is active (for example changing only between frames), only a single physical FIFO memory buffer need be implemented. This single physical FIFO memory buffer is then be switched to either position depending on whether vertical up or down-sampling is to occur.

The buffers 13 and 22 are also referred to as decoupling memory buffers.

The horizontal re-sampling and modification of the horizontal blanking also requires some memory buffering. However, the amount required is negligible compared with the vertical re-sampling requirement.

As described above, the apparatus 10 performs a matching of the input frame rate of the video stream $V_{IN}$ with the output frame rate of the output stream $V_{OUT}$. In accordance with the present invention, this apparatus 10 comprises one or two memory buffers 13 or 22 and an output frame generator 14, as discussed above. Regulating means are employed that implement a control feedback regarding a state of the memory buffer 13 or 22. Memory buffer 13's state (communicated via line 25) is used when the resampler 15 is vertically up-scaling, whilst the memory buffers 22's state (communicated via line 25) is used when the resampler 15 is vertically down-scaling. The regulating means allow the state to be monitored. It performs a regulation between two or more different settings in order to momentarily slow down or speed up the output frame rate of the output stream $V_{OUT}$. Note that this assumes conventional line-by-line scanning of the pixel data. For column-by-column scanning of course it is scaling in the horizontal axis that is the determining factor.

The inventive aspect of the apparatus 10 lies in the signaling of the fullness of the memory buffer 13 or 22 relative to one or more threshold level(s). This signaling is done by means of the threshold measurement unit 8 and the line 25. The respective threshold signals are either provided to the output frame generator 14 if the invention is realized inside the generator 14, or via the line 25 to the synchronization control unit 27. The output frame generator 14 or the synchronization control unit 27 uses this information in order to adjust the output frame blanking and/or clock to maintain the frame synchronization (herein also referred to as matching the input frame rate of a video stream with the output frame rate of an output stream).

The output frame generator 14 samples the threshold signals received from the memory buffer 13 or 22 at one or more positions in the output frame. At each such sampling point, the frame generator 14 or the synchronization control unit 27 switches the output blanking layout and/or clock according to the threshold signals in order to maintain the FIFO level in the memory buffer 13 or 22 within the acceptable limits.

As illustrated in FIG. 1, the respective threshold signals are provided via the line 25 from the memory buffer 13 or 22 to the output frame generator 14 or the synchronization control unit 27. Information regarding the sampling point is fed from the output frame generator 14 or from the synchronization control unit 27 via the line 24 to the memory buffer 13 or 22. The line 24 is used during an auto setup procedure and is only necessary if the respective implementation has an auto setup feature. The threshold values communicated via line 24 replace pre-calculated values being provided by the control registers 26.

Further details will now be discussed in connection with two more specific embodiments of the invention.

In the following an embodiment is disclosed that is suitable for PC display applications, for instance. This embodiment of the inventive method is well-suited for applications in which an input video stream exhibits a stable timing (e.g., the display of video generated by a personal computer). In this embodiment a single threshold and sampling point are implemented with two alternative output frame blanking layout and clock settings.

One setting, referred to as the fast setting, generates output frames at the output side 18 of the output frame generator 14 that are slightly shorter in duration than the shortest possible input frame at the input side 11 of the apparatus 10 given worst-case clock variations and setup inaccuracies. The second setting, referred to as the slow setting, generates output frames that are slightly longer than the longest possible input frame given worst-case clock variations and setup inaccuracies.

The sampling point is placed at a position in the output frame layout for which the memory buffer prefill (FIFO prefill) is readily calculated or measured. The memory buffer prefill is the worst-case FIFO fullness required to guarantee that no buffer underflow can occur for a complete frame. Typically, this will be the start of the first non-blanking line in the output frame or the first non-blanking pixel in this line. The single threshold (FIFO threshold) is then set to the memory buffer prefill plus a FIFO drop. The FIFO drop is the worst-case amount the FIFO level at the sampling point can fall between frames with the fast setting being active.

Once setup, the output frame generator 14 alternates between sequences of frames at the fast and slow settings. When generating fast frames, the FIFO level at the sampling point steadily reduces until it falls just below the FIFO threshold and the frame generator 14 switches to slow frames. When generating slow frames, the FIFO level at the sampling point steadily rises until just above the FIFO threshold whereupon the frame generator 14 switches to fast frames. This setup allows the handling of the video stream to be constantly monitored and the frame rates to be matched on the fly.

The variation in FIFO level caused by the alternation around the FIFO threshold setting depends on the size of FIFO drop and FIFO rise (the worst-case amount the FIFO level at the sampling point can rise between frames with the slow setting active). These in turn depend on the amount input and output clocks can vary around their nominal settings and the precision with which the output video clock, as provided by the clock synthesizer 16, can be set to match a given input clock. In practical PC applications, quite small variations can be achieved (certainly less than 10% of the line interval). The additional memory buffer capacity required over the theoretical optimum of roughly 1.75 lines is thus quite small.

In the following paragraphs, the setup and startup of this embodiment is explained. The correct setup of the inventive synchronization mechanism requires the FIFO prefill and FIFO drop to be known in order to correctly set the FIFO threshold. The latter is readily calculated from the known characteristics of the clock synthesizer 16 and input video sources and the fast and slow frame generator layouts. In practice it usually suffices to use a simple constant worst-case value. The FIFO prefill, however, is relatively difficult to calculate. To do so requires modeling the sampling-point interpolation calculation performed by the cropping/capture device 12 to derive the relative timing of line input/output. In practice, it is simpler to measure the value required by running the output frame generator 14 in a special auto setup mode.

In a specific embodiment the output frame generator 14 thus is designed such that it can be run in a special setup mode. This is an optional feature.

In the setup mode the frame generator 14 switches or is switched to the fast clock/frame layout settings and runs normally except that it pauses whenever a FIFO underflow—reading pixel data for output when the FIFO 13 or 22 is empty—might otherwise occur. This pausing automatically synchronizes (matches) the output frames with the input frames: the pauses in the first output frame bring the phase difference between input and output frames to very nearly the value required to avoid underflow. The pauses in subsequent frames precisely match the difference in duration between input and (fast) output frames. Furthermore, the number of pauses exactly corresponds to the additional pixels that would need to be present in the FIFO 13 or 22 at the sampling point to avoid underflow during normal operation. Thus, the FIFO floor can be found simply by measuring the number of pauses in the second and subsequent setup frame and adding it to the number of pixels present in the FIFO 13 or 22 at the sampling point. In practice, variations in the duration of input frames relative to output frames mean that the measured FIFO floor values are not completely accurate. To obtain a safe approximation a safety factor corresponding to the expected worst-case clock variations should be added. Again, in practice, a simple constant worst-case value would be used. During setup mode the output 18 to an attached display device may be blanked/suppressed to prevent visible glitches during this synchronization.

Once two or more frames have been processed in the setup mode so that the synchronization has been achieved and the FIFO threshold set, the frame generator 14 can cleanly switch or can be cleanly switched to a normal mode of operation at the start of a frame. If the display device is very sensitive to timing variations it could be necessary to suppress the output during the first frame of normal operation. The embodiments of the invention can be provided with means that suppress the output during the first frame of normal operation.

In the following paragraphs an embodiment for TV applications with varying input line rate and phase is disclosed.

The method discussed above can also be applied line-by-line instead of frame-by-frame in order to maintain synchronization when re-sampling video signals whose horizontal synchronization frequency and/or phase vary within a frame. Such distorted video signals are common in TV/video applications, as they are produced during 'trick-mode' playback from videotape. If completely stable output timing is required very large decoupling memory buffers 13 or 22 are necessary to accommodate such fluctuations. In practice, however, the display devices receiving the re-sampled video stream $V_{OUT}$ (e.g. TFT panel displays) can often tolerate fluctuations in output timing provided the variations from line to line remain within certain limits. If the worst-case input variations are less than the tolerable variations when averaged over a frame, then, provided output timing/horizontal blanking is regulated to compensate for input timing variations, memory buffers 13 or 22 only little larger than those required for stable video can be used.

For this particular application of the invention the output video clock, as provided by the clock synthesizer 16, may be slaved to maintain a fixed frequency relative to the input clock/input horizontal synchronization. Using a suitable slaving mechanism, for example a phase locked loop with suitable time constant(s), frequency variations in the input stream are to a large extent compensated away. What typically remains are shifts in input horizontal synchronization phase relative to the output caused by phase shifts in the input and any lag or/over-shoot in the regulation of the output video clock.

To compensate such phase shifts (and any small residual shifts in relative frequency) two thresholds—floor threshold and ceiling threshold—are used. Both thresholds are sampled every non-blanking line. If the FIFO fullness is between these two thresholds, a 'normal' output clock/horizontal blanking setting is selected where the rate image data is read from the FIFO 13 or 22 matches as closely as possible the rate of its arrival (input frame rate of the video stream) when the input timing is nominal. If the FIFO fullness falls below the floor threshold at a sampling point, then a slow clock/horizontal blanking setting is selected where image data is read from the FIFO 13 or 22 slower than it arrives. If the FIFO fullness exceeds the ceiling threshold at a sampling point, then a fast clock/horizontal blanking setting is selected where the image data is read from the FIFO 13 or 22 more quickly than it arrives.

The key point is that the line length and/or duration variations are introduced by the output frame generator 14 in order to compensate for input variations that have accumulated to the point at which a memory buffer underflow or overflow might occur.

In the present embodiment, the floor threshold is set so that if it is reached at a sampling point a FIFO underflow is just avoided before the next sampling point if worst-case input timing fluctuation occurs. The ceiling threshold is similarly set so that if it is not exceeded overflow is just avoided. The correct thresholds settings are readily derived from the duration of the image-data carry parts of the input and output lines. The fast and slow clock/blanking settings used depend on the worst-case input timing variations that can be encountered. The output line-rate when the slow setting is selected must be such that even with a worst-case combination of minimum input line frequency and minimally spaced positive (input-delaying) shifts in horizontal synchronization the buffer 13 or 22 will tend to fill up. The line rate when the fast setting is selected must cause the buffer 13 or 22 to empty even with a worst-case combination of minimum input line frequency and minimally spaced negative shifts in horizontal synchronization.

The size of the buffer 13 or 22 required of course depends on the amount of decoupling required for the re-sampling, as performed by the re-sampling unit 15, and the size of the input timing variations that must be accommodated. Typically, between 2 and 3 lines are required. If a free-running output clock is used (i.e. if the clock synthesizer 16 is not slaved to maintain a fixed frequency relative to the input clock/input horizontal synchronization), a FIFO size of 3-4 lines may be needed.

In the following it is discussed how a vertical synchronization for varying length frames can be maintained.

In TV/video applications it is also possible for the number of lines per frame to vary. Again the usual cause is trick-mode playback from a videotape. The method presented herein to maintain vertical synchronization for stable video may not be appropriate in these circumstances, even if a slaved output clock is used.

The following alternative mechanism may be used in these circumstances. The frame generator 14 is setup with a frame layout with the minimum acceptable vertical blanking with one blanking line (usually the last front porch line) to be, designated as the synchronization line. The frame generator 14 repeats this synchronization line until the input frame reaches a designated reference position. This position is typically using line/pixel co-ordinates or as the point reached a designated number of clock ticks after the start of a designated line. The reference position is set so that it coincides with to the end of the synchronization line in the output frame when input and output frames are synchronized (matched) to just keep the memory buffer 13 or 22 above the FIFO floor level (see above) at the first floor sampling point.

Figure 2:
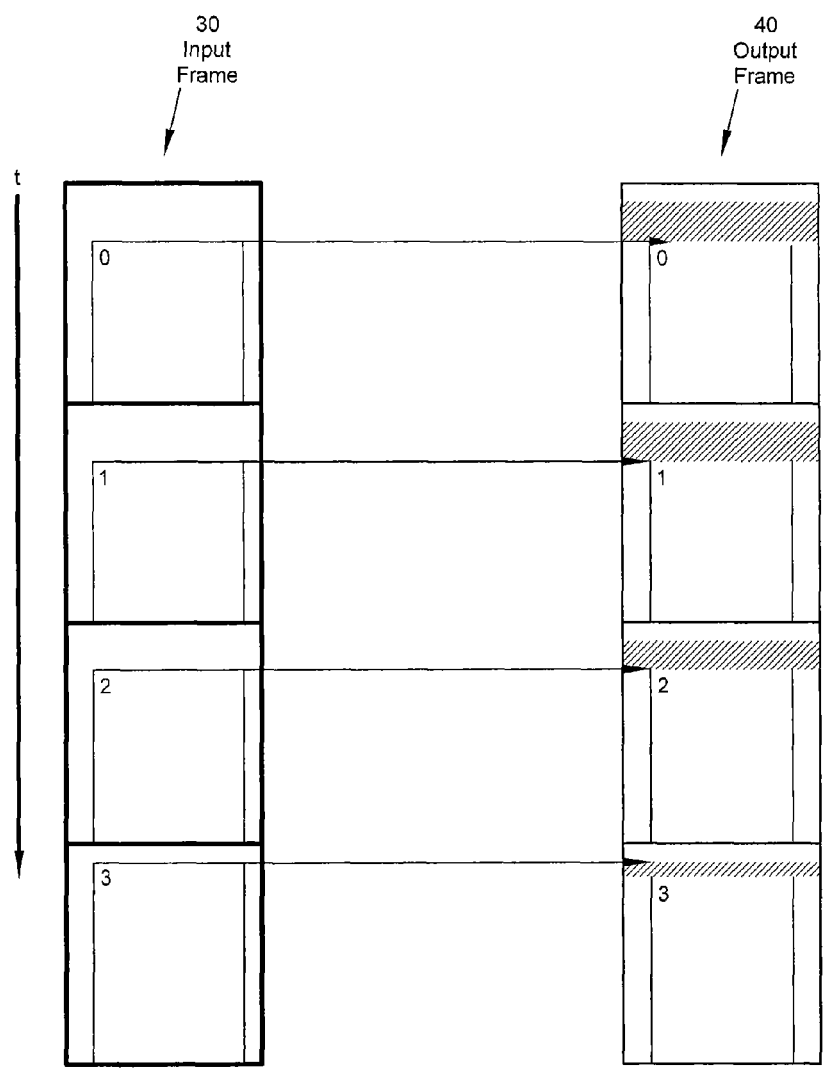
FIG. 2 is an example of the automatic compensation for a reduced input line count through reduced synchronization line repetitions.

If the embodiment is setup in this way, the inventive synchronization line mechanism automatically adjusts the number of blanking lines between the output frames to maintain synchronization without excessive pre-filling of the memory buffer 13 or 22 (see FIG. 2). To establish synchronization no special operating mode is needed: it suffices to commence the input capture at the start of an input frame. If this is done, then the output frame generator 14 simply generates blanking lines until it synchronizes with the first captured input frame.

FIG. 2 shows a simple illustrative example how the regulation of the number of repeats of a blanking line based on signal 23 allows automatic compensation for input frames of varying numbers of line and/or varying blanking duration. In this illustration the input 30 and output 40 frame timing are initially synchronized (input and put Frame 0). The cropping/capture device 12 is set up so that the signal 23 is triggered when P pixels from the first re-sampled line(s) derived from captured input frame are available for output at the chosen output clock. P is of course selected so that it is just large enough that output in the active area of the output frame can proceed without risk of under-run. The output frame generated is set up so that the line R immediately before the first active output line is repeated until signal 23 is triggered.

Initially (input and output frames 0) input and output are synchronized and the input frame is the expected nominal length. The repetition of line R until signal 23 arrives means output starts less than one output line interval after P pixels are available. Hence under-run-free output can occur.

The input frame 1 is shorter than the nominal size. At the start of the output frame 1 synchronization is not visibly changed compared to frame 0. Since the same cropping start position is used for frame 1 the delays between the start of the output frame and signal 23 being triggered is the same. However, the frame 1 ends much earlier than the frame 0 so that the output frame 0 continues to be generated whilst the input frame 2 commences. The result is that the delay between the start of the output frame 2 and the signal 23 being triggered is reduced by precisely the amount frame 1 is shorter than frame 0. Hence the line R repetitions are reduced and again the output starts less than one output line interval after P pixels are available. Hence under-run-free output can occur.

The input frames 2 and 3 are reduced in length still further, producing a still further reduced repetitions of line R from output frame 3 onwards. The crucial point is that in all cases it can be guaranteed that the output commences less than one output line interval after P pixels are available. This not only implies that under-run free output can be guaranteed but that no more than the maximum number of pixels that can accumulate in the FIFO buffer in a single output line interval need be buffered over and above P (the absolute minimum required for decoupling). For the FIFO buffering scheme shown (buffering input for vertical up-scaling and output for vertical down-scaling) this worst-case additional buffering requirement is never exceeds one line of pixels.

Since the vertical synchronization is only maintained to line-level precision, this mechanism requires the use of a larger memory buffer than the method suitable for stable input video. However, the memory buffer size required (around 3 lines of pixels) is not significantly in excess of that which is in any case needed to maintain horizontal synchronization during non-blanking lines.

The same mechanism can also be used to achieve vertical synchronization of stable input video streams without the need to vary the line length or clock frequency. However, a memory buffer size of around 3 lines is still required.

In the following refinements and alternative embodiments are addressed. The refinements and alternatives can be used together with any of the embodiments described herein.

In practice it is often useful to separate the point at which the switching of the clock/frame layout takes place from the sampling point. For example, many TFT display devices require that the number of blanking cycles in a line remains constant through the vertical back porch and the lines carry image data. For such TFT display devices the switching of the frame layout, as carried out by an inventive apparatus, should be delayed from the sampling point to take place in the vertical front porch (the blanking lines coming before vertical synchronization). The inventive apparatus may be designed to provide for such a delay.

If large changes in the clock frequency setting are required the clock synthesizer 16 may need to provide mechanisms to gradually shift the clock speed from the current to the newly selected value rather than abruptly switching.

A finer control of the FIFO level can be achieved for both horizontal and vertical synchronization using additional thresholds. For example, using two floor thresholds the synchronization control unit 27 or the frame generator 14 could select between a slow and very slow settings depending on how close to the FIFO floor the FIFO level at the sampling point(s) is.

The embodiments addressed above are well suited for video reformatting where a frame-rate conversion is not required, such as for example: low-cost matrix display devices, TV format conversion, display/video output for computer graphics, and so forth.

In the drawings and specification there has been set forth preferred embodiments of the invention and, although specific terms are used, the description thus given uses terminology in a generic and descriptive sense only and not for purposes of limitation.

The invention claimed is:

1. An apparatus for matching timing of an input video stream with timing of an output video stream, the apparatus comprising:
    at least one memory buffer for receiving and storing video data at an input frame rate of the input video stream,
    an output frame generator coupled to the at least one memory buffer for receiving video data from the at least one memory buffer at an output frame rate, and
    regulating means coupled to the at least one memory buffer and the output frame generator for implementing feedback control that permits a state of the at least one memory buffer, to be monitored, and for controlling a regulation, based on said state, between two or more different timing settings to selectively slow down or speed up the output frame rate.

2. The apparatus of claim 1, wherein the regulating means sends at least one threshold signal from the at least one memory buffer to the output frame generator, and wherein the output frame generator samples each said threshold signal at at least one sampling point.

3. The apparatus of claim 2, wherein, at each said sampling point, the output frame generator selectively switches the output frame rate by selectively switching between the two or more different timing settings.

4. The apparatus of claim 1, wherein the output frame generator implements the two or more different timing settings as one of alternative output frame layouts, different output frame rates, and different output line lengths.

5. The apparatus of claim 4, wherein the output frame generator uses respective ones of the alternative output frame layouts to respectively generate:
    fast output frames that are slightly shorter in duration than a shortest possible input frame, and
    slow output frames that are slightly longer in duration than the longest possible input frame.

6. The apparatus of claim 5, wherein the output frame generator alternates between output frame sequences of the fast and slow output frames.

7. The apparatus of claim 2, wherein one of the sampling points corresponds to a position, in an output frame layout implemented by the output frame generator, that guarantees no underflow of the at least one memory buffer.

8. The apparatus of claim 2, wherein said monitored state is a fullness of the at least one buffer, and comprising setup means that allow the apparatus to be switched from a normal mode of operation into a setup mode which is used to set a threshold so that a corresponding said threshold signal is issued when the at least one memory buffer becomes filled to the threshold.

9. The apparatus of claim 1, wherein the matching is done on a frame-by-frame or line-by-line basis.

10. The apparatus of claim 8, wherein the setup mode is used to set a floor threshold and a ceiling threshold to compensate for phase shifts between the input video stream and the output video stream.

11. The apparatus of claim 10, wherein said output frame generator selects one of
    a normal said timing setting if the fullness of the at least one memory buffer is between the floor threshold and the ceiling threshold,
    a slow said timing setting if the fullness of the at least one memory buffer falls below the floor threshold, and a fast said timing setting if the fullness of the at least one memory buffer exceeds the ceiling threshold.

12. A method for processing an input video stream that includes video data transmitted at an input frame rate, comprising:
receiving the video data,
temporarily storing the video data in a memory buffer at the input frame rate,
monitoring the fullness of the memory buffer to determine whether the fullness reaches a pre-defined threshold, and
sampling the threshold signals received from the memory buffer at one or more positions in the output frame;
regulating, based on the fullness of the memory buffer, between two or more different timing settings of an output frame rate at which video data are output by the memory buffer and sent to an output frame generator, to selectively slow down or speed up the output frame rate.

13. The method of claim 12 being employed in order to maintain a frame synchronization between the input video stream and an output video stream produced by the output frame generator.

14. The method of claim 12 being employed in order to match the input frame rate with a frame rate of an output video stream produced by the output frame generator.

15. The method of claim 12 wherein an auto setup is performed in order to define at least one said pre-defined threshold for use in said monitoring.

16. An apparatus configured to match timing of an input video stream with timing of an output video stream, the apparatus comprising:
at least one memory buffer for receiving and storing video data at an input frame rate of the input video stream, the at least one memory buffer configured to generate a threshold signal indicative of a fullness of the at least one memory buffer; and
an output frame generator coupled to the at least one memory buffer for receiving video data from the at least one memory buffer and generating output frames of video data, said output frame generator configured to sample threshold signal;
a threshold measurement unit,
wherein the output frame generator selects among two or more different timing settings depending on the threshold signal, the two or more different timing settings including:

a fast timing setting where the output frame generator generates output frames that are slightly shorter in duration than the shortest possible input frame to ensure that video data is output from the at least one memory buffer faster than video data is input to the at least one memory buffer, and
a slow timing setting where the output frame generator generates output frames that are slightly longer in duration than the longest possible input frame to ensure that video data is output from the at least one memory buffer slower than video data is input to the at least one memory buffer.

17. The apparatus of claim 16, wherein the at least one memory buffer is configured to send a plurality of threshold signals to the output frame generator, and the output frame generator is configured to sample each of the threshold signals at at least one sampling point.

18. The apparatus of claim 16, wherein the output frame generator implements the two or more different timing settings as alternative output frame layouts
a fast setting generating output frames that are shorter in duration than a shortest possible input frame, and
a slow setting generating output frames that are longer in duration than the longest possible input frame.

19. The apparatus of claim 16, wherein the output frame generator implements the two or more different timing settings as one of: alternative output frame layouts, different output frame rates, and different output line lengths.

20. The apparatus of claim 16, wherein the at least one memory buffer is further configured to support a floor threshold and a ceiling threshold to facilitate monitoring the fullness of the at least one memory buffer in order to compensate for phase shifts between the input video stream and the output video stream;
the output frame generator being further configured to, based on the fullness of the memory buffer, selectively implement one of:
a normal timing setting if the fullness of the memory buffer is between the floor threshold and the ceiling threshold,
the slow timing setting if the fullness of the memory buffer falls below the floor threshold, and
the fast timing setting if the fullness of the memory buffer exceeds the ceiling threshold.

* * * * *